(12) United States Patent
Friedrich et al.

(10) Patent No.: US 8,612,511 B2
(45) Date of Patent: Dec. 17, 2013

(54) SYSTEM AND METHOD FOR COMMUNICATION BETWEEN A MOBILE DATA PROCESSING DEVICE AND A STATIONARY DATA PROCESSING DEVICE

(75) Inventors: Wolfgang Friedrich, Bubenreuth (DE); Mehdi Hamadou, Erlangen (DE); Dirk Jahn, Aachen (DE); Bruno Kiesel, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 973 days.

(21) Appl. No.: 10/362,624

(22) PCT Filed: Aug. 9, 2001

(86) PCT No.: PCT/DE01/03064
§ 371 (c)(1),
(2), (4) Date: Jun. 17, 2003

(87) PCT Pub. No.: WO02/17131
PCT Pub. Date: Feb. 28, 2002

(65) Prior Publication Data
US 2004/0105427 A1    Jun. 3, 2004

(30) Foreign Application Priority Data

Aug. 22, 2000 (DE) .................................. 100 41 104

(51) Int. Cl.
*G06F 15/173* (2006.01)
(52) U.S. Cl.
USPC ........................................................ 709/203
(58) Field of Classification Search
USPC ................. 709/201, 203, 213, 217, 223, 224
See application file for complete search history.

(56) References Cited

U.S. PATENT DOCUMENTS

| 5,950,201 A * | 9/1999 | Van Huben et al. ............ 707/10 |
| 6,549,933 B1 * | 4/2003 | Barrett et al. ................. 709/203 |
| 6,847,336 B1 * | 1/2005 | Lemelson et al. ................ 345/8 |

FOREIGN PATENT DOCUMENTS

DE             198 34 456         2/2000

OTHER PUBLICATIONS

"Address." downloaded from <http://dictionary.reference.com/browse/address> on Sep. 28, 2007.*
Neumann, Ulrich and Majoros, Anthony. "Cognitive, Performance, and Systems Issues for Augmented Reality Applications in Manufacturing and Maintenance". Virtual Reality Annual International Synopsium 1998. Mar. 14-18, 1998.*
Pfeifer, et al., "A Modular Location-Aware Service and Application Platform", Computers and Communications, 1999, pp. 137-148.

(Continued)

*Primary Examiner* — Scott Christensen
(74) *Attorney, Agent, or Firm* — Staas & Halsey LLP

(57) ABSTRACT

A stationary data processing device communicates with a mobile data processing device, such as a client in the field of augmented-reality techniques in an automation system, or a production machine, or a machine tool or parts thereof. The stationary data processing device includes a server for communication with a browser on the mobile data processing device; an information broker for providing context-related information; legacy systems that contain and store information; and an information model that represents the information space and that allows navigation within the information and access to the information by the information broker independent of the legacy systems. The information broker utilizes the actual context, especially location, work situation, EA devices used and the information model.

15 Claims, 1 Drawing Sheet

(56) References Cited

OTHER PUBLICATIONS

Pagendarm, H.-G., "Visualization within environments supporting human communication", Future Generations Computer Systems, 1999, pp. 109-117.

Leonhardi, et al., "Virtual Information Towers—A Metaphore for Intuitive, Location-Aware Information Access in a Mobile Environment", Wearable Computers, 1999, pp. 15-20.

Nakagawa, et al., "Plant Maintenance Support Systems by Augmented Reality", Systems, Man, and Cybernetics, 1999, pp. I-768-I-772.

* cited by examiner

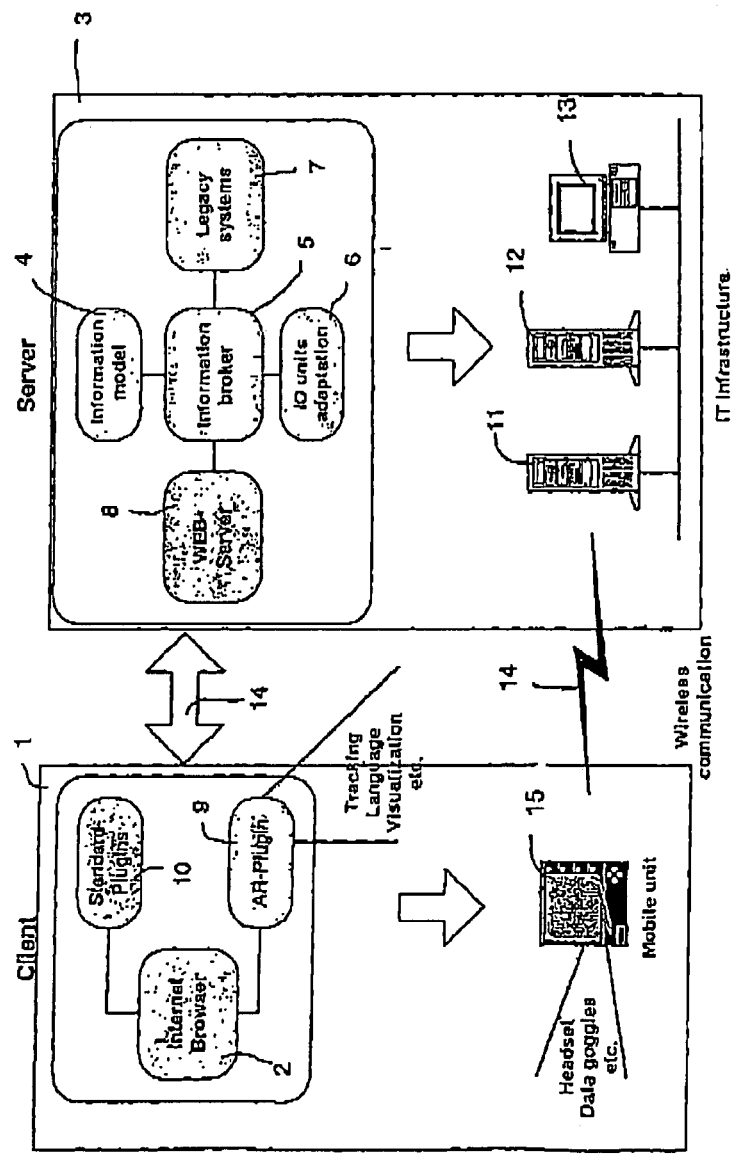

SYSTEM AND METHOD FOR COMMUNICATION BETWEEN A MOBILE DATA PROCESSING DEVICE AND A STATIONARY DATA PROCESSING DEVICE

CROSS REFERENCE TO RELATED APPLICATIONS

This application is based on and hereby claims priority to German Patent Application No. 10041104.5 filed on Aug. 22, 2000, the contents of which are hereby incorporated by reference.

BACKGROUND OF THE INVENTION

1. Field of the Invention

The invention relates to a system for communication between a mobile data processing device, particularly a client in the area of augmented reality technologies in an automation system, and/or a production machine and/or machine tool or parts thereof, having a browser installed on the mobile data processing device for the purpose of communication with a stationary data processing device.

2. Description of the Related Art

Such a system and method are used, by way of example, in the area of automation technology, in production machines and machine tools, in diagnosis/service support systems and for complex components, units and systems, such as vehicles and industrial machines and installations. One particularly advantageous application is in connection with AR (Augmented Reality), a novel form of human/technology interaction in which information is revealed to the user in his field of vision—for example using data goggles. The revelation is context-dependent, however, i.e. appropriate and derived from the object under consideration, e.g. a part. Thus, the actual field of vision of a fitter, for example, is augmented by information which is important to him, by revealing fitting instructions. In this case, augmented reality can replace the conventional fitting manual, among other things.

SUMMARY OF THE INVENTION

The invention is based on an object of specifying a system and a method for communication between a mobile data processing device and a stationary data processing device which allows effective wireless information management in situ, particularly in connection with AR applications.

Augmented reality is a novel form of human/technology interaction in which information is revealed to the user in his field of vision—for example using data goggles. The revelation is context-dependent, however, i.e. appropriate and derived from the object under consideration, e.g. a part. Thus, the actual field of vision of a fitter, for example, is augmented by information which is important to him, by revealing fitting instructions. In this case, augmented reality can replace the conventional fitting manual, among other things. The approach to a solution presented in this case relates to the use of augmented reality (AR) in fitting and in the area of service and maintenance.

The solution is proposed for mobile systems which are connected to an IT infrastructure by wireless transmission technologies. They are connected to the IT infrastructure using customary communication components and web technologies. The mobile system has an "empty" Internet browser. If required, the browser reloads standard plugins (PDF, CAD, ... ) and a special plugin for augmented reality. The Internet browser communicates with web servers which have further components connected downstream of them for procuring/providing information:

Information Broker
The task of the information broker is to provide information suited to the situation. This involves the information broker using the current context (location, work situation, IO units used) and the information model. The information broker assists free navigation through the database.

Information Model
The information model is a representation of the information space and allows the information broker to navigate within the information and to access the information independently of the downstream legacy systems.

Legacy systems (e.g. PMMS=Plant Maintenance Management System or PDM=Product Data Management) contain and store the information IO Units Adaptation
The information for user interactions has a nonrepresentative structure and is mapped onto the specific hardware profile on the basis of the current context. This allows the interaction units to be easily changed (e.g. output using display or voice). The nonrepresentative information is described using XML.

BRIEF DESCRIPTION OF THE DRAWINGS

These and other objects and advantages of the present invention will become more apparent and more readily appreciated from the following description of exemplary embodiment, taken in conjunction with the accompanying drawing of which:

FIG. 1 is a basic block diagram for the system structure of a system for web-based communication between a mobile data processing device and a stationary data processing device.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

FIG. 1 shows a basic block diagram for the system structure of a system for web-based communication between a mobile data processing device 1 and a stationary data processing device 3. The mobile data processing device 1, also referred to below as the client, contains an Internet browser 2 for communication with a web server 8 on the stationary data processing device 3, which is also referred to below as the server. Wireless communication between the mobile data processing device 1 and the stationary data processing device 3 takes place via a wireless communication network location 14. The Internet browser 2 can reload "standard plugins" 10 and, if required, also a special AR plugin 9 for augmented reality. The mobile data processing device 1 is, by way of example, in the form of a mobile unit having a display 15 or, in other variants, is in the form of a headset with data goggles etc. Besides the web server 8, the stationary data processing device contains an information broker 5, an information model 4, legacy systems 7 and an adaptation part for input/output units 6. The stationary data processing device 3 is in the form of computer systems or single computers 11, 12, 13.

In the sphere of fitting, service and maintenance, the activities to be performed are becoming more and more complex and are therefore increasing the information requirement in situ. The information requirement in this sphere is today satisfied by a broad spectrum of solutions. At one end, there is pure paper documentation, and at the other end there are solutions using portable computers (wearable). However, the PC-based solutions are frequently special solutions which are not neatly linked to the IT infrastructure and therefore cause synchronization problems with the central systems. Another drawback of today's PC-based mobile solutions is in the adoption of the operating paradigms for the PC applications, which are not designed for handsfree use. In addition, the application and data are on the mobile unit and thus presuppose powerful systems. These solutions can be used appropriately only for a small class of application instances, since they are not easy to work with and are expensive and complex.

The approach to a solution presented in this case relates to the use of augmented reality (AR) in fitting and in the area of service and maintenance.

The solution is proposed for mobile systems which are connected to an IT infrastructure by wireless transmission technologies. They are connected to the IT infrastructure using customary communication components and web technologies. The mobile system has an "empty" Internet browser. If required, the browser reloads standard plugins (PDF, CAD, . . . ) and a special plugin for augmented reality.

The Internet browser communicates with web servers which have further components connected downstream of them for procuring/providing information:

Information Broker
  The task of the information broker is to provide information suited to the situation. This involves the information broker using the current context (location, work situation, IO units used) and the information model. The information broker assists free navigation through the database.
Information Model
  The information model is a representation of the information space and allows the information broker to navigate within the information and to access the information independently of the downstream legacy systems.
Legacy Systems
  Legacy systems (e.g. PMMS, PDM) contain and store the information.
IO Units Adaptation
  The information for user interactions has a nonrepresentative structure and is mapped onto the specific hardware profile on the basis of the current context. This allows the interaction units to be easily changed (e.g. output using display or voice). The nonrepresentative information is described using XML.
AR Plugin
  The AR plugin is responsible for presenting the augmented information and in this case communicates with (likewise reloadable) components which are required for controlling the presentation (e.g. voice interaction).
Information Model
  The information model is a representation of the information space. The model is enhanced by supplementary information (meta-information) (e.g. content, title, headwords). This also allows search mechanisms to be integrated into the system. The actual documents remain in the legacy systems (e.g. databases, file systems, PDM systems, etc.). That is to say no multiple data management is operated.
Mobile Unit
  The mobile terminal essentially requires an Internet browser. Depending on the desired functionality in the AR area, it is therefore possible to use systems ranging from small palmsize PCs to full portable PCs. The necessary peripheral equipment of the mobile units is also geared to the scope of the augmentation. Typical peripheral units are:
  Headset
    for voice interaction
  Data Goggles
    for directly revealing the information in the user's field of vision
  Video Camera
    for tracking, documentation, etc.
  Tracking Systems
    for identifying the location, viewing direction, etc.
Wireless Communication
  Communication between the Internet browser and the web server takes place wirelessly using different technologies respectively matched to the area of use. Examples are:
  Bluetooth for the local area
  Wireless LANs
  GSM/GPRS/UMTS for the remote area
The scope of information transmitted is matched to the available bandwidth by the AR system.
Advantages of the Solution:
  The combination of web technologies, augmented reality functions and information systems arises a relatively high-quality DP system having a series of advantages.
  Thin Client Approach
    Very good scalability in the area of the mobile terminal, since the low-end area essentially requires a unit with an Internet browser. That is to say PC-based systems cannot be used either. (Weight, working and cost advantages).
  Incorporation in IT Landscape
    The approach proposed is extremely suitable for incorporation in existing and future IT landscapes (trend in the direction of the web). The user can thus achieve a high level of data continuity without complex synchronization operations.
  Automatic Configuration
    Implementation of the AR functionality of a plugin allows all of the application software to be automatically reloaded using customary web mechanisms.
  Mobility
    The lightweight, portable terminals and the radiolink to the IT infrastructure result in a high level of mobility for the user.
  Handsfree
    The supported periphery (headset, data goggles, etc.) allows handsfree working in the areas of fitting, service and maintenance.
  Online
    The possible online link to the IT infrastructure for the user allows direct updating of data both on the mobile system and in the backend system in the background.
  Use of Standards
    The use of web standards allows multiple participation in further developments in this area. These are firstly new protocols/new services in the web sphere, and secondly also the further developments in mobile terminals which allow web access.

The invention has been described in detail with particular reference to preferred embodiments thereof and examples, but it will be understood that variations and modifications can be effected within the spirit and scope of the invention.

The invention claimed is:

1. A stationary data processing device to communicate with a mobile data processing device, comprising:
  at least one computer including:
    a server wirelessly communicating with the mobile data processing device operating as a client, an empty Internet browser being installed on the mobile data processing device to selectively load or reload a standard plug-in and a special plug-in in correspondence with a specific hardware profile of the mobile data processing to implement an augmented reality functionality;

legacy systems, including at least one of a Plant Maintenance Management System and a Product Data Management System, that contain and store information; and an information broker providing information corresponding to a current context of a physical object under consideration, location, work situation, input and output units used, and where the information broker provides an information model providing a representation of an information space and navigates within the information of the current context suited to the client independent of access to the legacy systems, and the client accesses data maintained in said legacy systems using the information broker, and the information broker augments the information space in correspondence with a specific hardware profile of any of user interaction units to provide the augmented reality functionality in at least one of an industrial automation system, a production machine, machine tool, and parts thereof, and the information space being changed to meet the specific hardware profile of the mobile data processing device based on the current context by loading or reloading one of the standard plug-in and the special plug-in to said empty browser of the mobile data processing device.

2. The stationary data processing device as claimed in claim 1, wherein the information model is a representation of the information space and the information model is enhanced by supplementary meta-information while information of the legacy systems is maintained.

3. The stationary data processing device as claimed in claim 1, wherein a function of the augmented reality technologies causes a plug-in to be automatically reloaded in accordance with information of the current context provided by the information broker.

4. A method of communication between a mobile data processing device and a stationary data processing device, comprising:

providing a server that wirelessly communicates with the mobile data processing device operating as a client, an empty Internet browser being installed on the mobile data processing device to selectively load or reload a standard plug-in and a special plug-in in correspondence with a specific hardware profile of the mobile data processing to implement an augmented reality functionality;

providing information by an information broker, based on a current context of a physical object under consideration, location, work situation, input and output units used; and providing, via the information broker, an information model providing a representation of an information space and enabling the information broker to navigate within information of the current context independent of the legacy systems, and displaying, in the mobile data processing device acting as a client and using the information provided by the information broker, and where the legacy systems includes at least one of a Plant Maintenance Management System and a Product Data Management System; and the information broker augments the information space in correspondence with a specific hardware profile of any of user interaction units to provide the augmented reality functionality in at least one of an industrial automation system, a production machine, machine tool, and parts thereof, and the information space being changed to meet the specific hardware profile of the mobile data processing device based on the current context by loading or reloading one of the standard plug-in and the special plug-in to said empty browser of the mobile data processing device.

5. The method as claimed in claim 4, wherein the input and output units of the stationary data processing device are adapted for information for user interactions having a non-representative structure, and wherein said method further comprises mapping the user interactions onto a specific hardware profile based on the current context.

6. The method as claimed in claim 5, further comprising describing nonrepresentative information using XML.

7. The method as claimed in claim 6, further comprising:

presenting augmented information by a component augmented reality plugin in the client, and controlling said presenting using voice interactions, and wherein said communicating includes communication of the augmented information with reloadable components required for said controlling of said presenting.

8. The method as claimed in claim 4, wherein the information model is a representation of the information space, and wherein said method further comprises enhancing the information model by supplementary information.

9. The method as claimed in claim 8, wherein said communicating between the browser and the server takes place wirelessly using different technologies respectively matched to an area of use, including at least one of Bluetooth for a local area, a wireless LAN, and for a remote area, at least one of GSM, GPRS, and UMTS, and wherein information to be transmitted to the browser is determined based on available bandwidth by the augmented reality technologies.

10. A stationary data processing device to communicate with a mobile data processing device, comprising:

at least one computer including:

a server wirelessly communicating with the mobile data processing device operating as a client, an empty Internet browser being installed on the mobile data processing device to selectively load or reload a standard plug-in and a special plug-in in correspondence with a specific hardware profile of the mobile data processing to implement an augmented reality functionality;

legacy systems, including at least one of a Plant Maintenance Management System and a Product Data Management System, that contain and store information; and an information broker providing information corresponding to a current context of a physical object under consideration, location, work situation, input and output units used, and where the information broker provides an information model providing a representation of an information space and navigates within the information of the current context suited to the client independently of and without having to access said legacy systems, and the client accesses data maintained in said legacy systems using the information broker, and the information broker augments and the information space in correspondence with a specific hardware profile of any of user interaction units to provide the augmented reality functionality in at least one of an industrial automation system, a production machine, machine tool, and parts thereof, and the information space being changed to meet the specific hardware profile of the mobile data processing device based on the current context.

11. The stationary data processing device as claimed in claim 10, wherein the input and output units are adapted and said information broker provides a nonrepresentative structure for information for user interactions that are current-context-dependent mapped onto a specific hardware profile.

12. The stationary data processing device as claimed in either of claim 11, wherein nonrepresentative information may be described using XML.

13. The stationary data processing device as claimed in claim 12, wherein the client features a component augmented reality plugin for presenting the augmented information and communicates using reloadable components required for controlling presentation using voice interactions.

14. The stationary data processing device as claimed in claim 13, wherein the information model is an information space representation enhanced by supplementary information.

15. The stationary data processing device as claimed in claim 14,
  wherein said server includes communication interfaces for wireless communication with the browser matched to an area of use, using at least one of Bluetooth for a local area, a wireless LAN, and, for a remote area, GSM, GPRS, and UMTS, and
  wherein said server determines information to be transmitted to the client for the augmented reality technologies based on available bandwidth.

* * * * *

UNITED STATES PATENT AND TRADEMARK OFFICE
CERTIFICATE OF CORRECTION

PATENT NO.        : 8,612,511 B2
APPLICATION NO.   : 10/362624
DATED             : December 17, 2013
INVENTOR(S)       : Friedrich et al.

It is certified that error appears in the above-identified patent and that said Letters Patent is hereby corrected as shown below:

On the Title Page, In Column 2 item (56), under (Other Publications), Line 6, delete "Synopsium" and insert -- Symposium --, therefor.

In the Claims:
In Column 5, Lines 65-66, In Claim 4, delete "device acting as a client and using" and insert -- device using --, therefor.
In Column 7, Line 4, In Claim 12, delete "and the" and insert -- the --, therefor.
In Column 7, Lines 18-19, In Claim 12, delete "device as claimed in either of claim 11," and insert -- device as claimed in claim 11, --, therefor.

Signed and Sealed this
Twenty-fifth Day of March, 2014

Michelle K. Lee
*Deputy Director of the United States Patent and Trademark Office*